United States Patent
Williams et al.

(10) Patent No.: US 10,038,842 B2
(45) Date of Patent: Jul. 31, 2018

(54) PLANAR PANORAMA IMAGERY GENERATION

(71) Applicant: Microsoft Technology Licensing, LLC, Redmond, WA (US)

(72) Inventors: Samuel Thomas Williams, Redmond, WA (US); Jonathan Paul Rosenberg, Redmond, WA (US); Johannes Kopf, Bellevue, WA (US); Don Dongwoo Kim, Bellevue, WA (US); Sandeep Kanumuri, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 398 days.

(21) Appl. No.: 14/714,768

(22) Filed: May 18, 2015

(65) Prior Publication Data
US 2015/0249786 A1    Sep. 3, 2015

Related U.S. Application Data

(63) Continuation of application No. 13/286,756, filed on Nov. 1, 2011, now abandoned.

(51) Int. Cl.
*G06T 11/60* (2006.01)
*G06K 9/46* (2006.01)
(Continued)

(52) U.S. Cl.
CPC .......... *H04N 5/23238* (2013.01); *G06K 9/46* (2013.01); *G06K 9/6202* (2013.01);
(Continued)

(58) Field of Classification Search
None
See application file for complete search history.

(56) References Cited

U.S. PATENT DOCUMENTS

| 5,138,460 A | 8/1992 | Egawa |
| 5,473,364 A | 12/1995 | Burt |

(Continued)

FOREIGN PATENT DOCUMENTS

| CN | 1567385 | 1/2005 |
| CN | 1641702 | 7/2005 |

(Continued)

OTHER PUBLICATIONS

U.S. Appl. No. 13/325,652, Amendment and Response filed May 22, 2015, 14 pgs.

(Continued)

*Primary Examiner* — Richard Torrente

(57) ABSTRACT

One or more techniques and/or systems are disclosed for generating improved planar panorama imagery, which may be used to view street-level, human-scale locations along a desired path, for example. One or more desired objects can be detected in source imagery that may be used to produce the resulting planar panorama imagery. Respective object regions comprising a desired object can be identified in one or more frames of the source imagery. One or more portions of the source imagery that do not comprise the object region for the desired object can be joined with at least some of the one or more frames that do comprise the object region for the desired object. The resulting planar panorama imagery can thus comprise the desired object. Also, the planar panorama imagery can be generated so as to lack one or more non-desired objects and/or adverse effects that may result therefrom.

20 Claims, 8 Drawing Sheets

(51) Int. Cl.
*H04N 5/232* (2006.01)
*G06T 3/40* (2006.01)
*G06K 9/62* (2006.01)

(52) U.S. Cl.
CPC .......... *G06K 9/6267* (2013.01); *G06T 3/4038* (2013.01); *G06T 11/60* (2013.01); *G06K 2009/4666* (2013.01)

(56) References Cited

U.S. PATENT DOCUMENTS

| | | | |
|---|---|---|---|
| 5,973,726 | A | 10/1999 | Iijima et al. |
| 6,064,399 | A | 5/2000 | Teo |
| 6,075,905 | A | 6/2000 | Herman et al. |
| 6,205,253 | B1 | 3/2001 | King |
| 6,415,227 | B1 | 7/2002 | Lin |
| 6,665,003 | B1 | 12/2003 | Peleg et al. |
| 7,002,578 | B1 | 2/2006 | Ritter |
| 7,110,592 | B2 | 9/2006 | Kotake et al. |
| 7,298,548 | B2 | 11/2007 | Mian |
| 7,499,586 | B2 | 3/2009 | Argawala |
| 7,558,432 | B2 | 7/2009 | Zaharia et al. |
| 7,580,076 | B2 | 8/2009 | Battles et al. |
| 7,760,269 | B2 | 7/2010 | Ochs et al. |
| 7,840,032 | B2 | 11/2010 | Ofek |
| 7,899,270 | B2 | 3/2011 | Kim et al. |
| 8,174,562 | B2 | 5/2012 | Hartman |
| 8,269,822 | B2 | 9/2012 | Zalewski |
| 8,315,791 | B2 | 11/2012 | Bales |
| 8,368,720 | B2 | 2/2013 | Peterson |
| 8,610,741 | B2 | 12/2013 | Szeliski et al. |
| 8,868,336 | B2 | 10/2014 | Suzuno |
| 8,913,083 | B1 | 12/2014 | Ogale |
| 8,995,788 | B2 | 3/2015 | Williams |
| 2001/0038718 | A1 | 11/2001 | Kumar et al. |
| 2002/0154812 | A1 | 10/2002 | Chen et al. |
| 2002/0167533 | A1 | 11/2002 | Tirumalai et al. |
| 2002/0176635 | A1 | 11/2002 | Aliaga et al. |
| 2002/0196188 | A1 | 12/2002 | Holt |
| 2003/0169286 | A1 | 9/2003 | Misawa |
| 2005/0128196 | A1 | 6/2005 | Popescu et al. |
| 2005/0192924 | A1 | 9/2005 | Drucker et al. |
| 2006/0115181 | A1 | 6/2006 | Deng et al. |
| 2006/0120625 | A1 | 6/2006 | Peleg et al. |
| 2006/0214953 | A1 | 9/2006 | Crew et al. |
| 2007/0076920 | A1* | 4/2007 | Ofek ................ G06T 3/4038 382/113 |
| 2007/0103544 | A1 | 5/2007 | Nakazawa |
| 2007/0122058 | A1 | 5/2007 | Kitaura |
| 2007/0204014 | A1 | 8/2007 | Greer et al. |
| 2008/0043020 | A1 | 2/2008 | Snow et al. |
| 2008/0051997 | A1 | 2/2008 | Rosenberg |
| 2008/0066000 | A1 | 3/2008 | Ofek |
| 2008/0140309 | A1 | 6/2008 | Jendbro |
| 2008/0170804 | A1 | 7/2008 | Zhang et al. |
| 2008/0268876 | A1 | 10/2008 | Gelfand et al. |
| 2008/0291201 | A1 | 11/2008 | LaFon |
| 2008/0291217 | A1 | 11/2008 | Vincent et al. |
| 2008/0309668 | A1 | 12/2008 | Borovikov |
| 2009/0021576 | A1* | 1/2009 | Linder ................ G03B 37/00 348/36 |
| 2009/0031246 | A1 | 1/2009 | Cowtan et al. |
| 2009/0079730 | A1 | 3/2009 | Lee et al. |
| 2009/0116764 | A1 | 5/2009 | Liu |
| 2009/0208062 | A1 | 8/2009 | Sorek et al. |
| 2009/0240431 | A1 | 9/2009 | Chau et al. |
| 2010/0014436 | A1 | 1/2010 | Talagery |
| 2010/0014780 | A1 | 1/2010 | Kalayeh |
| 2010/0033553 | A1 | 2/2010 | Levy |
| 2010/0110069 | A1 | 5/2010 | Yuan |
| 2010/0118116 | A1 | 5/2010 | Tomasz et al. |
| 2010/0123737 | A1 | 5/2010 | Williamson |
| 2010/0146436 | A1 | 6/2010 | Jakobson et al. |
| 2010/0157018 | A1 | 6/2010 | Lampotang et al. |
| 2010/0194851 | A1 | 8/2010 | Pasupaleti et al. |
| 2010/0201682 | A1 | 8/2010 | Quan |
| 2010/0215250 | A1 | 8/2010 | Zhu |
| 2010/0220893 | A1 | 9/2010 | Lee |
| 2010/0251101 | A1 | 9/2010 | Haussecker et al. |
| 2010/0259610 | A1 | 10/2010 | Petersen |
| 2010/0302280 | A1 | 12/2010 | Szeliski et al. |
| 2010/0309293 | A1 | 12/2010 | Plut |
| 2011/0010650 | A1 | 1/2011 | Hess et al. |
| 2011/0018902 | A1 | 1/2011 | Ofek |
| 2011/0043604 | A1 | 2/2011 | Peleg et al. |
| 2011/0085027 | A1* | 4/2011 | Yamashita .......... G06T 5/003 348/49 |
| 2011/0096957 | A1 | 4/2011 | Anai et al. |
| 2011/0123120 | A1 | 5/2011 | Quack |
| 2011/0141141 | A1 | 6/2011 | Kankainen |
| 2011/0141229 | A1 | 6/2011 | Stec et al. |
| 2011/0158509 | A1 | 6/2011 | Li et al. |
| 2011/0158528 | A1 | 6/2011 | Yea et al. |
| 2011/0211040 | A1 | 9/2011 | Lindemann et al. |
| 2011/0265023 | A1 | 10/2011 | Loomis et al. |
| 2011/0279445 | A1 | 11/2011 | Murphy et al. |
| 2011/0279446 | A1 | 11/2011 | Castro et al. |
| 2011/0302527 | A1 | 12/2011 | Chen et al. |
| 2011/0304699 | A1 | 12/2011 | Ito |
| 2012/0036433 | A1 | 2/2012 | Zimmer et al. |
| 2012/0127158 | A1 | 5/2012 | Miyagi et al. |
| 2012/0133639 | A1 | 5/2012 | Kopf et al. |
| 2012/0293608 | A1 | 11/2012 | Doepke et al. |
| 2012/0294549 | A1 | 11/2012 | Doepke |
| 2013/0106990 | A1 | 5/2013 | Williams et al. |
| 2013/0155047 | A1 | 6/2013 | Williams et al. |
| 2013/0155180 | A1 | 6/2013 | Wantland et al. |
| 2013/0155181 | A1 | 6/2013 | Williams et al. |
| 2013/0156326 | A1 | 6/2013 | Williams et al. |
| 2013/0242041 | A1 | 9/2013 | Hollinger |
| 2013/0249812 | A1 | 9/2013 | Ramos et al. |
| 2014/0002588 | A1 | 1/2014 | Ahiska |
| 2015/0116360 | A1 | 4/2015 | Jones et al. |
| 2015/0249768 | A1 | 9/2015 | Williams et al. |
| 2016/0307299 | A1 | 10/2016 | Williams et al. |

FOREIGN PATENT DOCUMENTS

| | | |
|---|---|---|
| CN | 1845094 | 10/2006 |
| CN | 101251958 | 8/2008 |
| CN | 101666656 | 3/2010 |
| CN | 101841727 | 9/2010 |
| CN | 101852620 | 10/2010 |
| CN | 101923709 | 12/2010 |

OTHER PUBLICATIONS

U.S. Appl. No. 13/325,652, Amendment and Response filed Sep. 25, 2014, 12 pgs.
U.S. Appl. No. 13/325,652, Office Action dated Dec. 22, 2014, 12 pgs.
U.S. Appl. No. 13/325,652, Office Action dated Mar. 25, 2014, 10 pgs.
Sibiryakov, Alexander, "Photo collection representation, based on viewpoint clustering"—Published Date: Nov. 28, 2007, Proceedings: Electronic Imaging and Multimedia Technology, http://citeseerx.ist.psu.edu/viewdoc/download?doi=10.1.1.148.8701&rep=rep1&type=pdf, 12 pgs.
Kopf, et al., "Street Slide: Browsing Street Level Imagery"—Published Date: Jun. 20-25, 2009, Proceedings: Computer Vision and Pattern Recognition, 2009, CVPR 2009, IEEE Conference, http://research.microsoft.com/en-us/um/people/cohen/street_slide.pdf, 8 pgs.
Kroepfl, et al., "Efficiently Locating Photographs in Many Panoramas"—Published Date: 2010, Proceedings: 18th SIGSPATIAL International Conference on Advances in Geographic Information Systems, http://research.microsoft.com/en-us/um/people/cohen/street_slide.pdf, 10 pgs.
Chinese First Office Action cited in Chinese Application No. 201210541675.8 dated Feb. 16, 2015, 3 pgs.

(56) References Cited

OTHER PUBLICATIONS

PCT Int. Search Report cited in PCT Application No. PCT/US2012/069954 dated Apr. 29, 2013, 12 pgs.
PCT Int. Preliminary Report cited in PCT Application No. PCT/US2012/069954 dated Jun. 17, 2014, 6 pgs.
Chinese Second Office Action Issued in Patent Application No. 201210541675.8, dated Oct. 19, 2015, 12 Pages.
U.S. Appl. No. 13/325,612, Office Action dated May 15, 2014, 13 pgs.
U.S. Appl. No. 13/325,612, Amendment and Response filed Nov. 17, 2014, 10 pgs.
U.S. Appl. No. 13/325,612, Notice of Allowance dated Dec. 1, 2014, 7 pgs.
Yining Deng et al., "Generating Panorama Photos", Proceedings of SPIE vol. 5242 Internet Multimedia Management Systems IV, (SPIE, Bellingham, WA, 2003), pp. 270-279.
Zheng, Jiang Yu, "Stabilizing Route Panoramas"—Published Date: Aug. 23-26, 2004, Proceedings: 17th International Conference on Pattern Recognition, vol. 1, http://www.cs.iupui.edu/.about.jzheng/deshaking.pdf.
U.S. Appl. No. 13/325,430, Office Action dated Sep. 16, 2015, 22 pgs.
U.S. Appl. No. 13/325,466, Amendment and Response filed Dec. 9, 2015, 9 pgs.
U.S. Appl. No. 13/325,466, Notice of Allowance dated Jan. 13, 2016, 7 pgs.
Chinese Notice of Allowance in Application 201210540664.8, dated Jan. 8, 2016, 4 pgs.
"Navigation System for Virtual Reality Visualization of Large-Scale Datasets", http://www.urop.uci.edu/SURP/sample_proposals/SURP%20Engineering%205.pdf.
Chinese Notice of Allowance in Patent Application No. 201210541675.8, dated Apr. 13, 2016, 3 pgs.
Gonzalez, Nick, "Google Maps Now with 360 Streetside Views", May 29, 2007, pp. 1-3, http://www.techcrunch.com/2007/05/29/google-maps-now-with-360-streetside-views/.
U.S. Appl. No. 12/476,810, Amendment and Response filed Apr. 16, 2013, 13 pgs.
U.S. Appl. No. 12/476,810, Amendment and Response filed Sep. 24, 2012, 10 pgs.
U.S. Appl. No. 12/476,810, Notice of Allowance dated Aug. 13, 2013, 7 pgs.
U.S. Appl. No. 12/476,810, Office Action dated Jan. 17, 2013, 13 pgs.
U.S. Appl. No. 12/476,810, Office Action dated Jun. 22, 2012, 26 pgs.
U.S. Appl. No. 13/325,430, Amendment and Response filed Aug. 29, 2016, 16 pgs.
U.S. Appl. No. 13/325,430, Office Action dated May 18, 2016, 19 pgs.
U.S. Appl. No. 13/325,430, Office Action dated Oct. 7, 2016, 23 pgs.
Svennerberg, Gabriel, "Beginning Google Maps API 3", Apress Publishers, 2nd Edition, Jul. 27, 2010, pp. 73-79 and 181-192.
Agarwala, Aseem, "Photographing long scenes with multi-viewpoint panoramas", Published Date: 2006, http://vis.berkeley.edu/papers/longScenes/LongThings.pdf, 9 pgs.
Brown, et al., "Automatic Panoramic Image Stitching using Invariant Features", Retrieved at <<http://mesh.brown.1edu/engn1610/pdfs/Brown-ijcv2007.pdf>>, International Journal of Computer Vision, vol. 47, No. 1, 2007, pp. 59-73.
Chinese 1st Office Action cited in Chinese Application No. 201210540664.8, dated Oct. 10, 2014, 5 pgs.
Chinese 1st Office Action cited in Chinese Application No. 201210540807.5, dated May 16, 2014, 6 pgs.
Chinese 2nd Office Action cited in Chinese Application No. 201210540664.8, dated Jun. 12, 2015, 9 pgs.
Chinese 2nd Office Action cited in Chinese Application No. 201210540807.5, dated Jan. 6, 2015, 3 pgs.
Chinese Notice of Allowance in Application 201210540807.5, dated Mar. 2, 2015, 6 pgs.
Chinese Office Action Reply filed in in Chinese Application No. 201210540807.5, dated Sep. 28, 2014, 6 pgs.
Fleck, et al., "Graph Cut based Panoramic 3D Modeling and Ground Truth Comparison with a Mobile Platform—The Wagele", Retrieved at «http://ieeexplore.ieee.org/stamp/stamp.jsp?tp=&arnumber=1640374», The 3rd Canadian Conference on Computer and Robot Vision, Jun. 7-9, 2006, pp. 10.
http://www.superhighstreet.com, front page, About Us page, and Help & FAQ pages, 6 pages, Feb. 12, 2008.
Kopf et al., "Street Slide: Browsing Street Level Imagery", Published Date: 2010, http://research.microsoft.com/pubs/121744/Kopf-sg10.pdf, 8 pgs.
Kopf; et al., "Street Slide: Browsing Street Level Imagery", Retrieved Oct. 21, 2011, http://research.microsoft.com/en-us/um/people/cohen/street_slide.pdf.
Levin, et al., "Seamless Image Stitching in the Gradient Domain", Retrieved at «http://cs.engr.uky.edu/jacobs/classes/2010_photo/readings/gradient_domain_stitching.pdf», Eighth European Conference on Computer Vision (ECCV), 2004, pp. 12.
Micusk; et al., "Piecewise Planar City 3D Modeling from Street View Panoramic Sequences", Published Jun. 25, 2009, Proceedings: IEEE Conference on Computer Vision and Pattern Recognition, 2009 (CVPR 2009), pp. 2906-2912, pp. 2906-2912, http://ieeexplore.ieee.org/stamp/stamp.jsp?tp=&arnumber=5206535.
PCT International Search Report cited in PCT Application No. PCT/US2012/067813, dated Mar. 22, 2013, 9 pgs.
PCT International Search Report, dated Mar. 26, 2013, Application No. PCT/US2012/069951, Filed date: Dec. 14, 2012, pp. 9.
PCT Preliminary Report cited in PCT Application No. PCT/US2013/069951, dated Jun. 17, 2014, 5 pgs.
Pollefeys, M., "Detailed Real-Time Urban 3D Reconstruction from Video-Springer." Detailed Real-Time Urban 3D Reconstruction from Video-Springer. Oct. 20, 2007, Oct. 20, 2007. Web. Apr. 21, 2014.
Rav-Acha et al., "Minimal Aspect Distortion (MAD) Mosaicing of Long Scenes", International Journal of Computer Vision, vol. 28, Issue 2-3, Jul. 2008, pp. 187-206.
Roman et al., "Automatic Multiperspective Images", Proceedings of the 17th Eurographics Conference on Rendering Techniques, 2006.
Shade, Jonathan et al., "Layered Depth Images", Jul. 19-24, 1998, In Proceedings of the 25th Annual Conference on Computer Graphics and Interactive Techniques (SIGGRAPH 1998), Orlando, Florida, ed. SIGGRAPH and Michael Cohen, 13 pgs.
Simonite, Technology Review, "A Smoother Street View", Published Date: Jul. 28, 2010, http://www.technologyreview.in/web/25880/, 4 pgs.
Szeliski, Richard, "Image Alignment and Stitching: A Tutorial", Published Date: Dec. 10, 2006, http://research.microsoft.com/pubs/70092/tr-2004-92.pdf, 89 pgs.
U.S. Appl. No. 12/957,124, Amendment and Response filed Oct. 29, 2013, 15 pgs.
U.S. Appl. No. 12/957,124, Amendment and Response filed Jun. 10, 2014, 13 pgs.
U.S. Appl. No. 12/957,124, Amendment and Response filed Jul. 19, 2013, 14 pgs.
U.S. Appl. No. 12/957,124, Notice of Allowance dated Jul. 22, 2014, 8 pgs.
U.S. Appl. No. 12/957,124, Office Action dated Mar. 10, 2014, 17 pgs.
U.S. Appl. No. 12/957,124, Office Action dated Apr. 22, 2013, 22 pgs.
U.S. Appl. No. 12/957,124, Office Action dated Jul. 31, 2013, 25 pgs.
U.S. Appl. No. 13/286,756, Amendment and Response filed Oct. 3, 2014, 12 pgs.
U.S. Appl. No. 13/286,756, Office Action dated Nov. 18, 2014, 18 pgs.
U.S. Appl. No. 13/286,756, Office Action dated Apr. 3, 2014, 19 pgs.
U.S. Appl. No. 13/325,430, Amendment and Response filed Dec. 21, 2014, 16 pgs.

(56) References Cited

OTHER PUBLICATIONS

U.S. Appl. No. 13/325,430, Amendment and Response filed Jul. 27, 2015, 15 pgs.
U.S. Appl. No. 13/325,430, Office Action dated Mar. 25, 2015, 18 pgs.
U.S. Appl. No. 13/325,430, Office Action dated Jun. 20, 2014, 12 pgs.
U.S. Appl. No. 13/325,466, Amendment and Response filed May 4, 2015, 13 pgs.
U.S. Appl. No. 13/325,466, Office Action dated Nov. 7, 2013, 14 pgs.
U.S. Appl. No. 13/325,466, Office Action dated Dec. 4, 2014, 16 pgs.
U.S. Appl. No. 13/325,466, Office Action dated Apr. 24, 2014, 15 pgs.
U.S. Appl. No. 13/325,466, Office Action dated Sep. 10, 2015, 6 pgs.
U.S. Appl. No. 13/325,466, Reply to Office Action filed Oct. 24, 2014, 12 pgs.
U.S. Appl. No. 13/325,466, Reply to Office Action filed Feb. 7, 2014, 11 pgs.
Xiao; et al., "Image-based Facade Modeling", Published Dec. 2008, Proceedings: ACM Transactions on Graphics (TOG) Proceedings of SIGGRAPH Asia 2008, http://web.mit.edu/jxiao/Public/publication/2008/TOG_facade/paper_low-res.pdf.
Xiao; et al., "Image-based street-side city modeling", Published Dec. 2009, Proceedings: ACM SIGGRAPH Asia 2009, http://md1.csa.com/partners/viewrecord.php?requester=gs&collection=TRD&recid=201006340377341CI&q=&uid=788264198&setcookie=yes.
U.S. Appl. No. 13/325,430, Amendment and Response filed Feb. 8, 2016, 17 pgs.
U.S. Appl. No. 13/325,652, Notice of Allowance dated Mar. 28, 2016, 7 pgs.
U.S. Appl. No. 13/325,430, Amendment and Response filed Feb. 17, 2017, 18 pgs.
U.S. Appl. No. 13/325,430, Office Action dated Jun. 6, 2017, 20 pgs.
U.S. Appl. No. 13/325,430, Amendment and Response filed Nov. 6, 2017, 22 pgs.
U.S. Appl. No. 13/325,430, Notice of Allowance dated Feb. 26, 2018, 12 pgs.
U.S. Appl. No. 15/195,470, Office Action dated Feb. 5, 2018, 12 pages.

\* cited by examiner

PLANAR PANORAMA IMAGERY GENERATION

RELATED APPLICATION

This application is a continuation of and claims priority to U.S. patent application Ser. No. 13/286,756, filed on Nov. 1, 2011 and titled "PLANAR PANORAMA IMAGERY GENERATION", at least some of which may be incorporated herein.

BACKGROUND

Digital photography can allow for a sequence of images to be stitched or glued together to provide for a relatively seamless transition from one image to the next. Further, images, such as human-scale lateral images, can be collected while traveling along a route, such as a street, and/or generated from other local imagery sources, for example. Stitching such images together can provide a user experience of travelling along a particular locale, for example.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

A side or lateral-view of panoramic imagery may comprise a series of images (e.g., photo frames, video frames, etc.) stitched/glued together to form a somewhat seamless view of the imagery. This type of planar panorama imagery typically displays many of the stitched together images at the same time. Currently, images stitched together in this manner can be utilized in conjunction with digital mapping services, where, for example, a user may view planar panorama-type images of a street associated with a map they may be viewing.

When moving laterally along planar panorama imagery a user might see different perspectives of objects in the panorama and/or objects in the images may be altered due to different viewing angles from which the different images were acquired and/or resulting from imprecisions in image stitching processes, for example. A business sign may, for example, be comprised within/across two adjacent images of a planar panorama image sequence, such that a first portion of the sign is in a first image and a second portion of the sign is in a second image. When the adjacent images are stitched together a resulting view of the sign may be distorted due to respective (different) viewing angles of the first and second images and/or the stitching process not aligning the images appropriately, for example. Further, the business sign may be fully or partially obscured by one or more other objects, such as a telephone pole, person, etc., where the sign may be more desirable to display than the obscuring object(s) in the resulting planar panorama of images.

Accordingly, one or more techniques and/or systems are disclosed that can provide for identifying one or more desired objects (e.g., interesting to a user) in one or more portions of planar panorama source imagery (e.g., sequential images or frames collected along a path). Further, non-desired objects (e.g., obscuring, distracting, and/or distorted objects) may be identified in at least some portions of the planar panorama source imagery. Regions in the source imagery that comprise desired and/or non-desired objects can be identified, and merely those frames (e.g., or portions thereof) of the source imagery that comprise desired views (e.g., comprising desired objects and not non-desired objects) may be joined together to generate planar panorama imagery.

In one embodiment of generating planar panorama imagery, an object region, comprising a desired object, can be identified in one or more frames of planar panorama source imagery. Additionally, one or more portions of the planar panorama source imagery, which do not comprise the desired object, can be joined with the one or more frames comprising the object region to generate the planar panorama imagery comprising the desired object.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
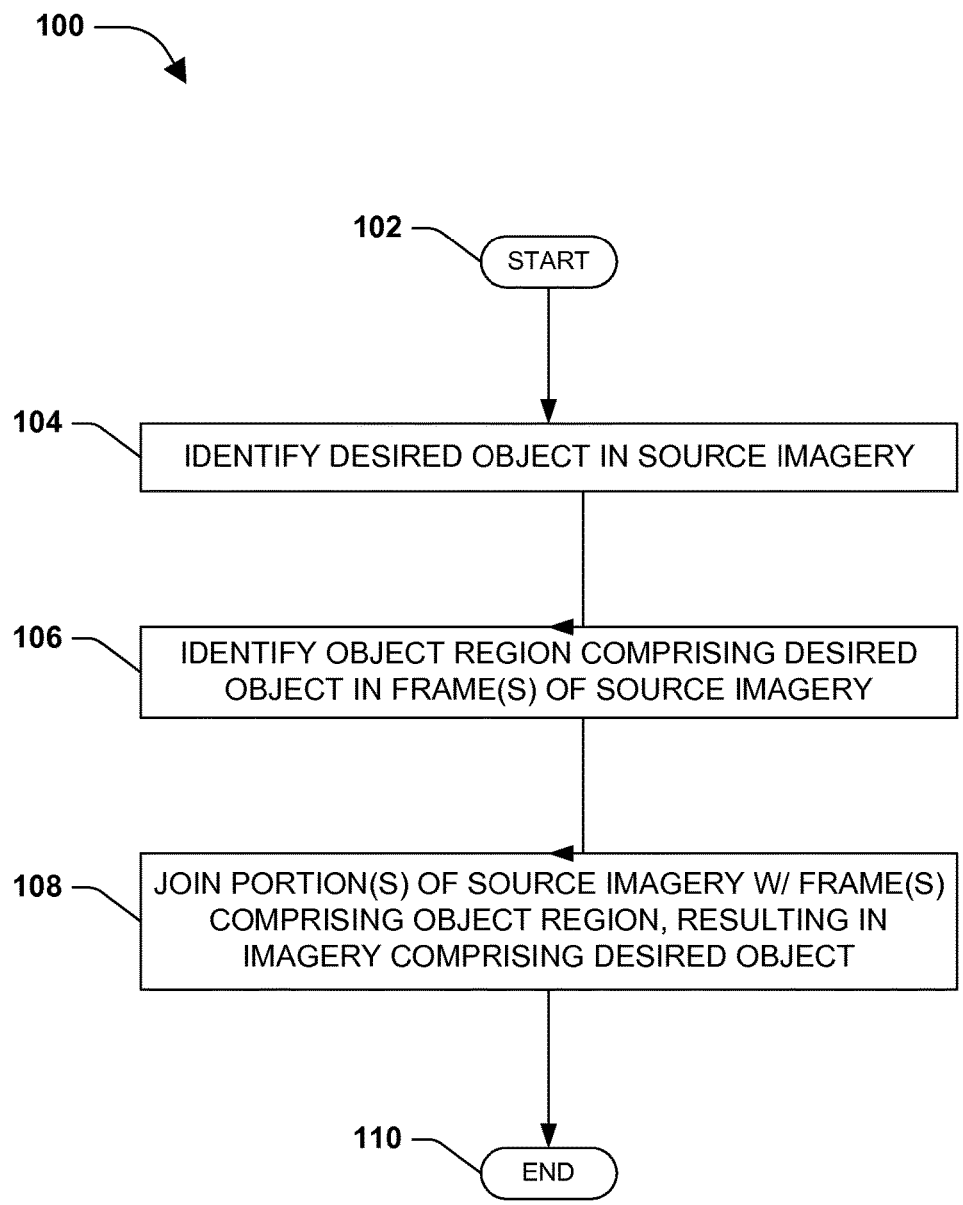
FIG. 1 is a flow diagram illustrating an exemplary method for generating planar panorama imagery.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

As provided herein, a method may be devised that provides for mitigating partial or full loss of interesting objects in planar panorama imagery. Further, objects of interest that may often be distorted due to incorrect meshing or joining of images in the planar panorama imagery may be addressed and/or appropriately corrected. Additionally, objects of distracting interest in the planar panorama imagery, such as people, moving cars, trees or poles, etc. that obscure interesting objects, can be accounted for by removal and/or by selecting a viewing angle with a desired result. In this way, for example, resulting planar panorama imagery may provide an improved user experience, where desired objects can be viewed and the presence of non-desired objects may be mitigated.

FIG. 1 is a flow diagram illustrating an exemplary method 100 for generating planar panorama imagery. The exemplary method begins at 102. At 104, a desired object can be identified in planar panorama source imagery (e.g., in one or more images or frames of the planar panorama source imagery). In one embodiment, a desired object may comprise an object (e.g., sign, building, landmark, portion of scenery, lamp-post, person, vehicle, etc.) in an image or frame that can be targeted for further processing. As an example, the desired object may comprise a business sign (e.g., hotel, shop, restaurant, etc.) captured in an image (e.g., comprised in the planar panorama source imagery) on a front of a building within which the business is located. In this embodiment, for example, the business sign may comprise a positive object that is intended to be included in the resulting planar panorama imagery (e.g., resulting from further processing), where the business sign may provide valuable information to a user viewing the planar panorama imagery (e.g., in an online mapping application).

At 106, an object region comprising the desired object is identified in one or more frames of the planar panorama source imagery. For example, the planar panorama source imagery can comprise a series (e.g., in relative sequence) of images or frames, which may have been collected along a path (e.g., road, street highway, etc.). In this example, respective frames may capture short intervals of a side-view of the path (e.g., one side of the street, laterally). Further, the object region can comprise, or rather be comprised within, a portion of the frame (e.g., a defined group of pixels, sub-pixels, etc.) that comprises the desired object (e.g., at least a portion of, or the entire object).

At 108, one or more portions of the planar panorama source imagery that do not comprise the desired object are combined with the one or more frames that comprise the identified object region (e.g., where the portions of the planar panorama source imagery may merely comprise (remaining) regions of frames because some regions of the frames have been excised and/or are otherwise not usable (e.g., because they contain undesirable/non-desired objects, such as a telephone pole, for example, and/or because they contain a desired object that has already been captured from another frame and thus "doubling" may occur if the object in that region was re-presented)). In this way, the resulting planar panorama imagery comprises the desired object. For example, one or more frames that comprise the object region, indicating the desired object, can be selected to be meshed with (e.g., stitched to, merged with, combined in some manner, etc.) at least some of the portions of the planar panorama source imagery that do not have the desired object. By selecting one or more frames that comprise a desired view of the desired object, the resulting planar panorama imagery, for example, can comprise the desired view of the desired object instead of a view that may provide an obscured view and/or distorted view of the desired object, for example.

Figure 2:
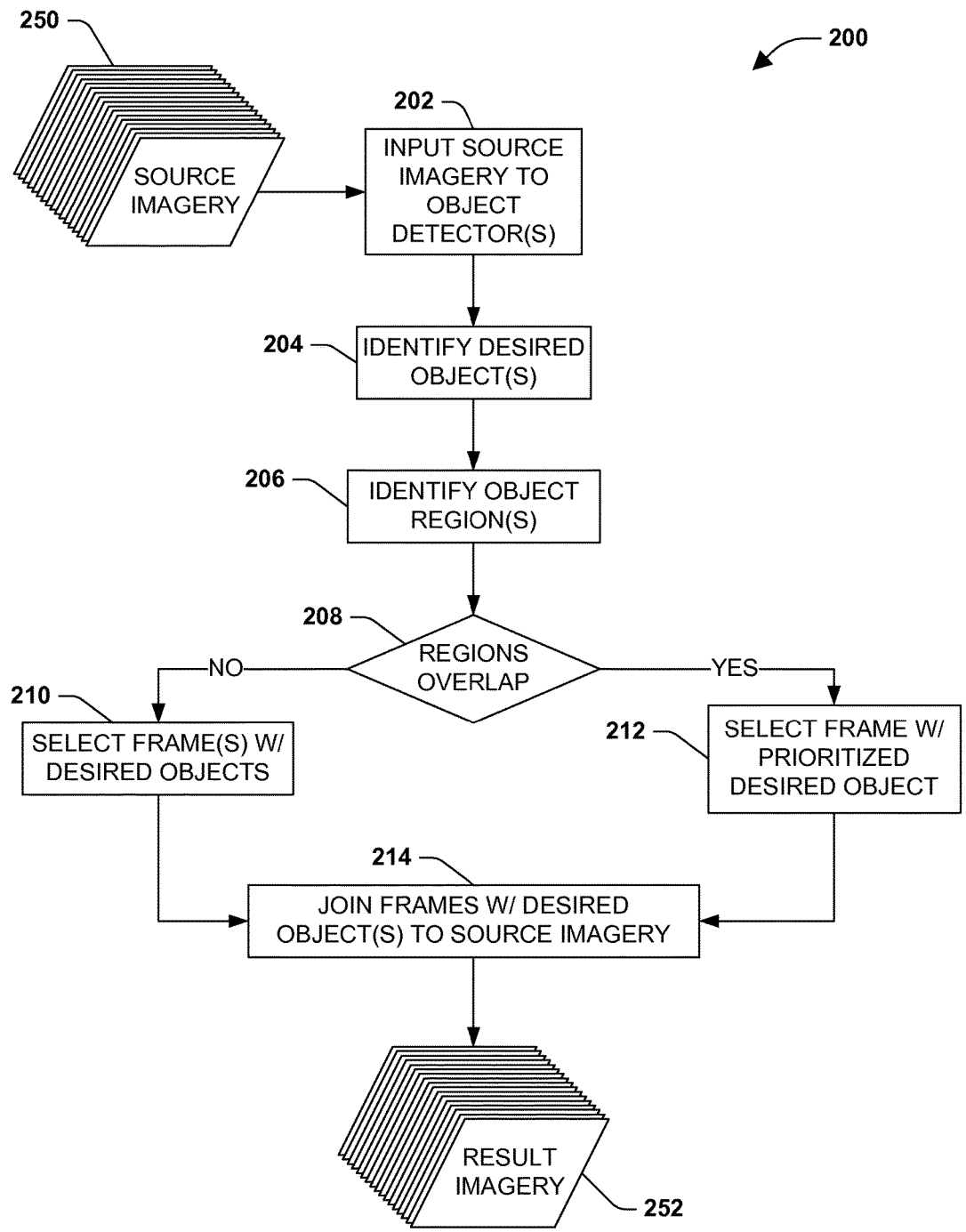
FIG. 2 is a flow diagram illustrating an example embodiment where one or more portions of one or more techniques described herein may be implemented.

FIG. 2 is a flow diagram illustrating an example embodiment 200 where one or more portions of one or more techniques described herein may be implemented. Planar panorama source imagery 250 (e.g., images acquired while driving down a street, and/or generated from other imagery acquired while driving down a street (e.g., or other location) from the same and/or different sources) may be collected and sequenced accordingly (e.g., in series illustrating a lateral view of one or more locations comprised along the street). At 202, the planar panorama source imagery 250 can be input to one or more object detectors, for example, where the one or more object detectors can respectively detect merely a particular object in image data.

In one embodiment, the planar panorama source imagery 250 can be input to a first object detector used for detecting merely a first object, and the planar panorama source imagery 250 can be input to a second object detector that may be used to merely detect a second object (e.g., and input to a third object detector to merely detect a third object, and so-on). As one example, a set of object detectors may comprise one or more of: a building detector, person detector (e.g., faces and/or people), landscape detector (e.g., trees, bushes, etc.), vehicle detector (e.g., stopped and/or moving), sign detector (e.g., text detector for business and/or street signs), utility object detector (e.g., utility pole, stop light, power lines, etc.), road section detector (e.g., medians), business logo detector, and/or building entryway detector (e.g., business entries, doors, etc.), etc. In this example, the planar panorama source imagery 250 can be input to the plurality of object detectors, where one or more of the object detectors may be activated for detecting an object in the planar panorama source imagery 250.

At 204 in the example embodiment 200, one of more desired objects can be identified in the planar panorama source imagery 250. In one embodiment, a desired object can be identified in the planar panorama source imagery using a desired object detector, for example, that may be designed to detect a desired object from among one or more detected objects (e.g., and that may comprise one or more object detectors). At 206, an object region that comprises the identified desired object can be identified in the planar panorama source imagery 250. In one embodiment, a first and a second desired object may be identified in the planar panorama source imagery 250 (e.g., using first and second desired object detectors, respectively); and, in one embodiment, a first object region comprising the first desired object, and a second object region comprising the second desired object, can be identified in one or more frames (e.g., images) of the planar panorama source imagery 250 (e.g., and a third, and fourth, etc.).

As an example, a desired object may be detected in image data (e.g., comprised in the planar panorama source imagery 250) based on the object's shape, color, edge arrangement, and/or other characteristics, for example. Further, in one example, using image data information provided by the object detection, a region in one of the frames of the image data that comprises the detected object can be identified. In one example, the object region identified in the frame may comprise a group of pixels and/or sub-pixels (e.g., color units described by the image data), which encompass the desired object. Additionally, in one example, a plurality of desired objects may be detected in the planar panorama source imagery 250, and, for the respective desired objects, a corresponding object region can be identified in at least one frame from the planar panorama source imagery 250.

Figure 4A:
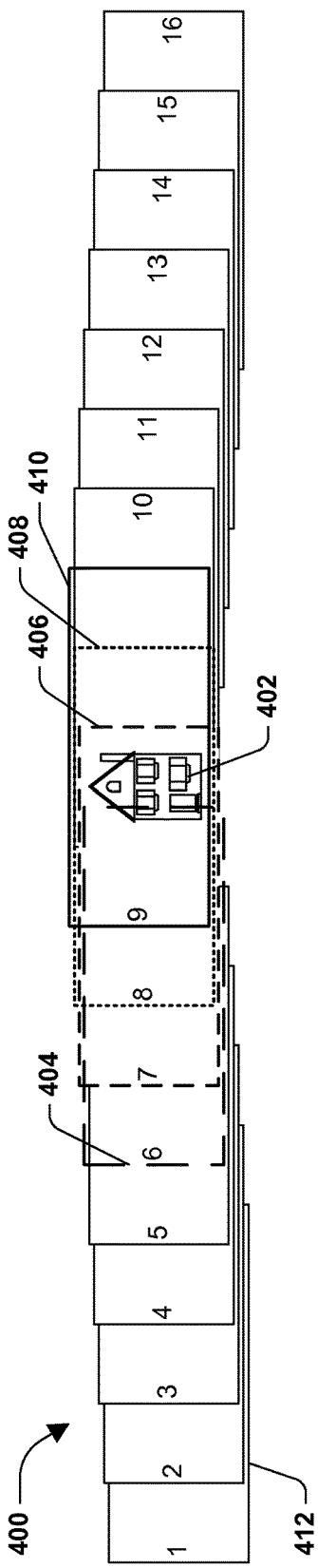
FIGS. 4A and 4B illustrate example embodiments where one or more portions of one or more techniques described herein may be implemented.

As an illustrative example, FIG. 4A illustrates an example embodiment 400 where one or more portions of one or more techniques described herein may be implemented. In this example 400, a set of frames or images 412 (e.g., photographs, video frames, etc.) may be arranged from one to sixteen, such that they can represent a consecutive sequence of images 412, for example, indicating a lateral view along one side of a path (e.g., road). In this example 400, the images 412 are stacked, where frame number nine 410 is situated on top of the stack (e.g., exposed in full view), with the frames one through eight 408 stacked underneath frame nine 410 to the left, and frames ten through sixteen stacked under frame number nine 410 to the right.

In this example 400, a desired object comprises a building 402. The building 402 is captured (e.g., at least partially) in frames six 404, seven 406, eight 408, and nine 410. In one embodiment, the desired object 402 can be identified in the set of images 412, where the images 412 comprise at least a portion of the planar panorama source imagery. In this embodiment, for example, an object region that comprises at least a portion of the desired object 402 may be identified in the respective frames six 404, seven 406, eight 408, and nine 410.

Figure 4B:
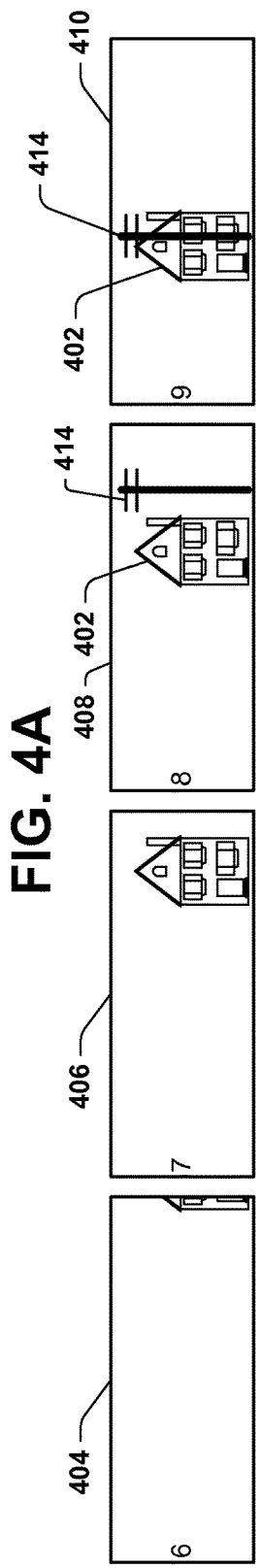

Returning to FIG. 2, at 208, it may be determined whether two or more object regions, respectively comprising a desired object, overlap in a frame. As an illustrative example, FIG. 4B illustrates an example embodiment 450 where one or more portions of one or more techniques described herein may be implemented. In frame number nine 410 two objects 402, 414 may have been identified, for example, and an object region may have been determined for the respective objects 402, 414. As illustrated in the frame number nine 410, the objects 402, 414 (e.g., and therefore the object regions) overlap, where the utility pole 414 may lie in front of the building 402. In the frame 408 of FIG. 4B, the building 402 and utility pole 414 do not overlap each other and, therefore, the respective object regions for the objects 402, 414 may not overlap in the frame 408.

Returning to FIG. 2, if at least two identified object regions do not overlap in a frame of the planar panorama source imagery 250 (NO at 208), at least one frame can be selected that comprises a desired object, at 210. In one embodiment, at least one frame may be selected that comprises more than one desired object, where the object regions for the respective desired objects do not overlap (e.g., frame eight 408 of FIG. 4B). In another embodiment, a first frame may be selected, where the first frame comprises a first object region comprising a first desired object; and a second frame may be selected, where the second frame comprises a second object region comprising a second desired object. In this way, for example, if at least a portion of the planar panorama source imagery comprises more than one desired object, merely those frames that comprise a non-overlapping view of the respective objects can be selected.

If at least two identified object regions do overlap in a frame (e.g., frame nine 410 of FIG. 4B) of the planar panorama source imagery 250 (YES at 208), at least one frame can be selected from the planar panorama source imagery 250 that comprises a prioritized desired object. In one embodiment, a first desired object can be prioritized over a second desired object, such that the first desired object may be selected for inclusion in resulting planar panorama imagery over the second desired object (e.g., and/or an object may be excluded from resulting planar panorama imagery). In this embodiment, a first object region, comprising the first desired object, can be prioritized over a second object region comprising the second desired object (e.g., and/or a desired object may be prioritized over a non-desired object, and/or a first non-desired object may be prioritized over a second non-desired object, etc.), based on the assigned prioritizations. As one example, a building and/or building sign may be assigned a higher prioritization than a utility pole, due to a likelihood of a user desiring to view the building and/or building sign in the resulting planar panorama imagery rather than a utility pole, for example.

As an illustrative example, in FIG. 4B, the frame number nine 410 may comprise overlapping object regions for the object 402, a building, and object 414, a utility pole. In this example, the frame number seven 406 may merely comprise the object region for the building object 402, based on a viewing angle 406A from which the image was captured. That is, for example, a viewing angle 410A for the frame number nine 410 may have placed the utility pole object 414 in front of the building object 402, based on a foreground distance between the utility pole and building from the viewing point 410A. In one example, the viewing angle 406A may provide for a view of the building, unobscured by the utility pole. Therefore, in this embodiment, for example, the frame number seven 406 may be selected, as it merely comprises the desired object 402, which is prioritized over the utility pole, and frame number seven 406 comprises the building 402 without the utility pole 414 overlapping.

In one embodiment, a frame that is selected from the one or more frames, such as to join with the one or more portions of the planar panorama source imagery, can comprise an object region that comprises an entirety of the desired object. As an illustrative example, in FIG. 4B, the frame number six 404 comprises merely a portion of the building object 402, which may be a result of a viewing angle 404A from which the image was captured. However, the frame seven 406 (e.g., and eight 408, and nine 410) comprises and entirety of the building object 402. In this embodiment, the frame seven 406 may be selected to join with the one or more portions of the planar panorama source imagery over the frame six 404.

In this way, for example, the entire desired object can be included (e.g., not just a portion of the object) in any resulting planar panorama imagery. As one example, a desired object may comprise a business sign (e.g., indicating a name and/or logo for a business). It may be desirable to include the names of businesses in street level, human view imagery, for example, so that a user can identify a desired business on a map (e.g., which may otherwise not be visible if merely a portion of a business sign was included). Further, in one embodiment, by selecting merely one frame that comprises the desired object in its entirety, for example, when frames are joined with the planar panorama source imagery that do not comprise the desired object, merely one instance of the desired object may be included in resulting imagery (e.g., and not two instances of the building sign and/or additional portions of the building).

Returning to FIG. 2, at 214, the one or more selected frames, comprising the desired object(s), can be joined with one or more portions of the planar panorama source imagery that do not comprise the desired object(s). In one embodiment, the joining can result in planar panorama imagery 252 that comprises one or more desired objects. As one example, a frame that comprises a business sign and/or logo can be joined with a first portion of the planar panorama source imagery at a first side of the frame, and joined with a second portion of the planar panorama source imagery at a second side of the frame.

As an illustrative example, in FIGS. 4A and 4B, the frame seven 406 may be selected for joining with the planar panorama source imagery, as it comprises the desired object 402. In one example, neighboring frames (e.g., six 404, eight 408 and nine 410) may not be selected for joining to the source imagery, as they comprise an instance of the desired object 402 (e.g., or a portion thereof), which can result in an undesirable "doubling" affect of the object in the planar panorama imagery. In this example, a left portion of the resulting planar panorama imagery may comprise the frames 412 from five to one of the planar panorama source imagery, and a right portion of the resulting planar panorama imagery may comprise the frames 412 from ten to sixteen of the planar panorama source imagery. Further, in this example, because there is some overlap between the frames 412, details of the planar panorama source imagery may not be lost by omitting some frames from the resulting planar panorama imagery.

It may be appreciated that, in one embodiment, frames need not be dropped (e.g., not used) merely because they contain a desired object which has already been captured from another frame and/or they contain a non-desired object. Rather, remaining portions (e.g., regions) of the frame can still be used. For example, the remainder of a frame is still usable where an object region of that frame comprises an object that has already been obtained from a different frame (e.g., merely the object region of that frame would not be used, such as to avoid "doubling", for example). Similarly, a negative region of a frame comprising a non-desired object may be excised from that frame leaving the remainder of the frame usable. For example, regions of frames six 404 and/or seven 406 that do not comprise the house may still be usable where the house has already been captured from another frame, such as frame eight 408, for example. Similarly, regions of frame eight 408 that do not comprise the telephone pole (non-desired object) may usable for joining with other frames and/or regions of frames, for example. It may be appreciated that such "region level" granularity is applicable to one or more of the embodiments (e.g., method(s), system(s), etc.) provided herein.

Further, as an example, the planar panorama imagery (e.g., 252 of FIG. 2) resulting from joining the one or more frames with the one or more portions of the planar panorama source imagery (e.g., 250 of FIG. 2), may comprise a plurality of desired objects, which have respectively been detected by a corresponding desired object detector, and for which a corresponding object region was identified. Additionally, as one example, based on a prioritization of respective desired objects, one or more frames may be selected that comprise a view of some, but not all of the desired objects, and/or a frame may comprise more than one desired object.

Figure 3:
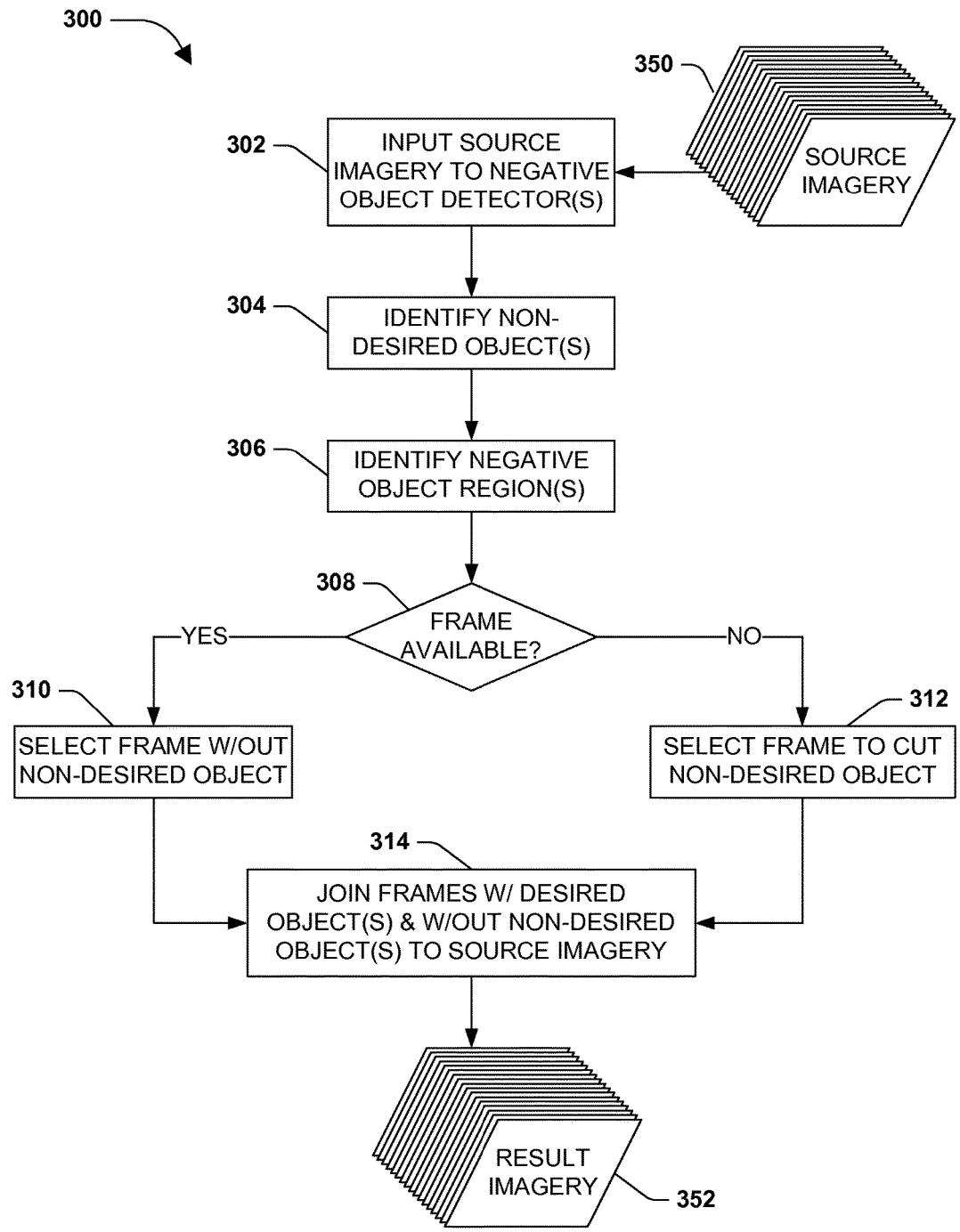
FIG. 3 is a flow diagram illustrating an example embodiment where one or more portions of one or more techniques described herein may be implemented.

FIG. 3 is a flow diagram illustrating an example embodiment 300 where one or more portions of one or more techniques described herein may be implemented. At 302, planar panorama source imagery 350 (e.g., 250 from FIG. 2) can be input to one or more negative object detectors. In one embodiment, a negative object detector may be used to identify a non-desired object in the planar panorama source imagery 350. As one example, a non-desired object can comprise an object that may reduce a user experience when the user views resulting planar panorama imagery 352, such as an object that obscures a view of a desired object (e.g., a tree in front of a sign indicating a name of a business), people present on a sidewalk, cars, utility structures, etc.

At 304 in the example embodiment 300, one or more non-desired objects can be identified in the planar panorama source imagery 350, for example, using the one or more negative object detectors. As an example, users typically view a planar panorama in conjunction with a mapping service that indicates a particular location, so that the user may become familiar with the environment at the location, or to browse various locations for desired businesses and/or landmarks. In one example, non-desired objects may be identified, which can be at least partially removed from the resulting planar panorama imagery viewed by the user, thereby improving the user experience. At 306, a negative object region can be identified in the one or more negative object frames, of the planar panorama source imagery 350, for the respective one or more non-desired objects, where the negative object region can comprise at least a portion of the non-desired object.

At 308, it may be determined whether at least one frame is available in the planar panorama source imagery 350 that does not comprise the negative object region. As an illustrative example, in FIG. 4B, the non-desired object may comprise a utility pole 414 that partially obscures a view of a desired object 402, the building, in frame number 410. In the example 450, frame number seven 406 comprises a view of the desired object 402, but does not comprise the non-desired object 414.

Returning to FIG. 3, if at least one frame is available that does not comprise the negative object region (YES at 308), the at least one frame without the non-desired object can be selected (e.g., select a non-negative frame) for joining with the planar panorama source imagery 350, at 310. If at least one frame is not available that does not comprise the negative object region (NO at 308), at least one negative frame that comprises the negative object region may be selected, for example, where the negative object region is arranged in a way that allows it to be removed with little to no effect one or more desired objects in the negative frame. For example, a negative frame may comprise the negative object region in such a way that it may be removed (e.g., cut out, covered, stitched over with another frame) from the frame without removing at least a portion of a desired object. As an illustrative example, in FIG. 4B, frame number eight 408 comprises a view of the desired object 402 and the non-desired object 414. In this example, the negative object region comprising the non-desired object 414 may be removed without removing a portion of the desired object 402.

Returning to FIG. 3, at 314, the one or more portions of the planar panorama source imagery can be joined with the one or more frames, that may not comprise the non-desired object(s), resulting in the planar panorama imagery 352 not comprising the non-desired object, and comprising one or more desired objects. In one embodiment, a non-negative frame that does not comprise the non-desired object, can be joined with the one or more portions of the planar panorama source imagery 350, resulting in the planar panorama imagery 352 not comprising the non-desired object (e.g., via path 310). In one embodiment, the negative object region can be cut from at least one of the negative frames selected, and the cut negative frame can be joined with the one or more portions of the planar panorama source imagery 350, resulting in the planar panorama imagery 352 not comprising the non-desired object (e.g., via path 312). It may be appreciated that aspects illustrated with respect to FIG. 2 and aspects illustrated with respect to FIG. 3 may be combined such that planar panorama source imagery comprising both desired objects and non-desired objects may be used to produce planar panorama imagery comprising a desired object but not comprising a non-desired object, for example.

A system may be devised that can mitigate partial or complete loss, and/or distortion of interesting objects in a planar panorama of images, such as a human scale view of a street side panorama. Objects of interest that may be distorted due to misalignment of neighboring images may be appropriately meshed. Further, those objects that may obscure an interesting object or are of a distracting interest in the planar panorama, such as people, moving cars, trees or poles, etc. may be removed and/or meshed in a way that provides a desired view. Resulting planar panorama imagery may provide an improved view of desired objects, where the influence of non-desired objects may be mitigated.

Figure 5:
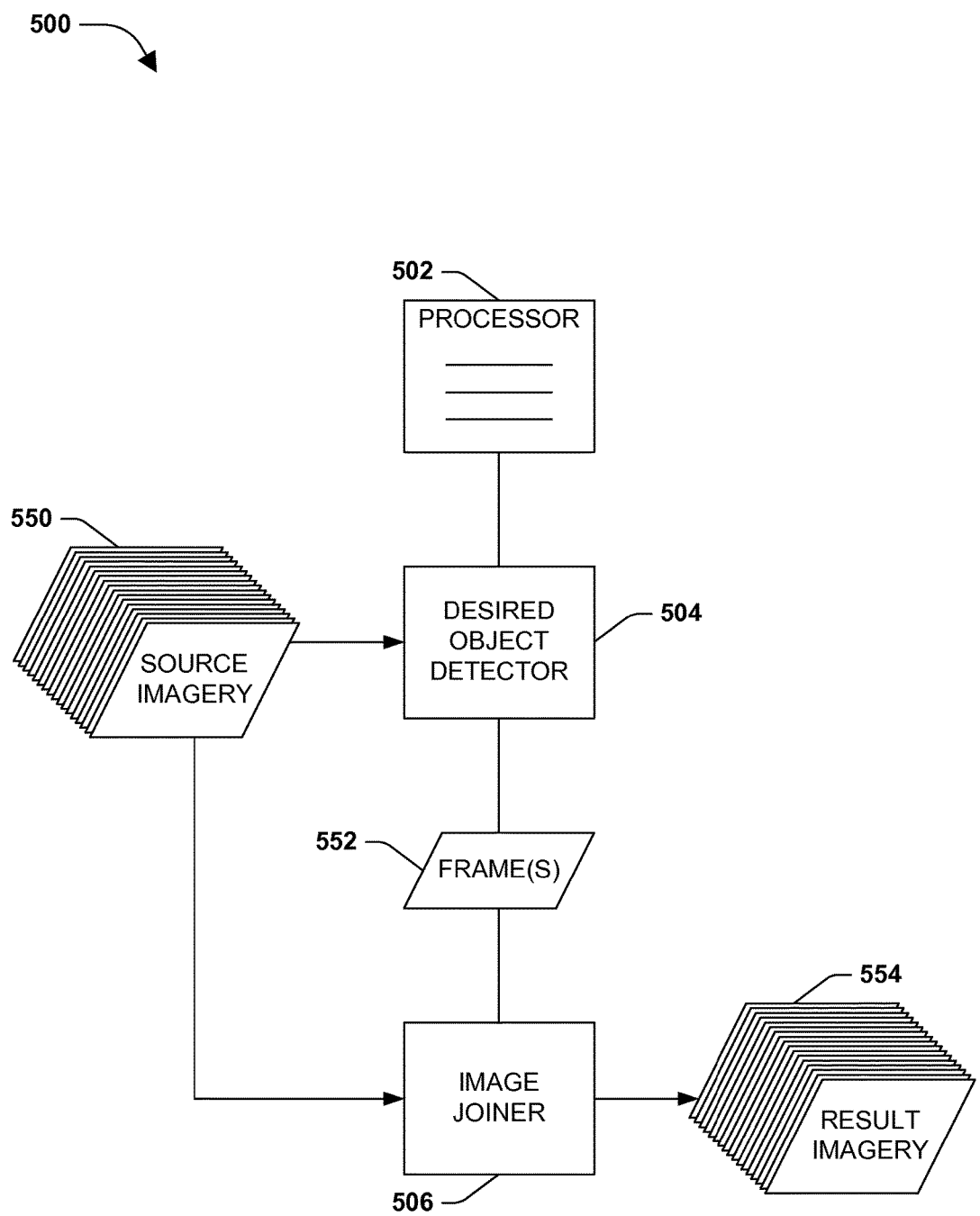
FIG. 5 is a component diagram illustrating an exemplary system for generating planar panorama imagery.

FIG. 5 is a component diagram illustrating an exemplary system 500 for generating planar panorama imagery. In the exemplary system 500, a computer-based processor 502, configured to process data for the system 500, is operably coupled with a desired object detection component 504. The desired object detection component 504 is configured to identify a desired object in one or more frames 552 of planar panorama source imagery 550. A desired object can comprise an image of an object, comprised in image data, for example, which may be of interest to a user of resulting planar panorama imagery 554 (e.g., used in association with a mapping application to view street-level, human-scale imagery of a desired location).

In the exemplary system 500, an image joining component 506 is operably coupled with the desired object detection component 504. The image joining component 506 is configured to join one or more portions (e.g., regions) of the planar panorama source imagery 550, which do not comprise the desired object, with the one or more frames 552 comprising the desired object, resulting in the planar panorama imagery 554. For example, a frame 552 of the planar panorama source imagery 550, comprising the desired object, may be joined with a first appropriate portion of the planar panorama source imagery 550, not comprising the desired object, at a first side of the frame; and may be joined with a second appropriate portion of the planar panorama source imagery 550, not comprising the desired object, at a second side of the frame, by the image joining component 506. In this way, for example, merely a desired view of the desired object (e.g., not distorted, and/or an entirety of the object) is comprised in the resulting planar panorama imagery 552, and/or merely a single view (e.g., not multiple instances and/or partial artifacts) is comprised in the resulting planar panorama imagery 552.

Figure 6:
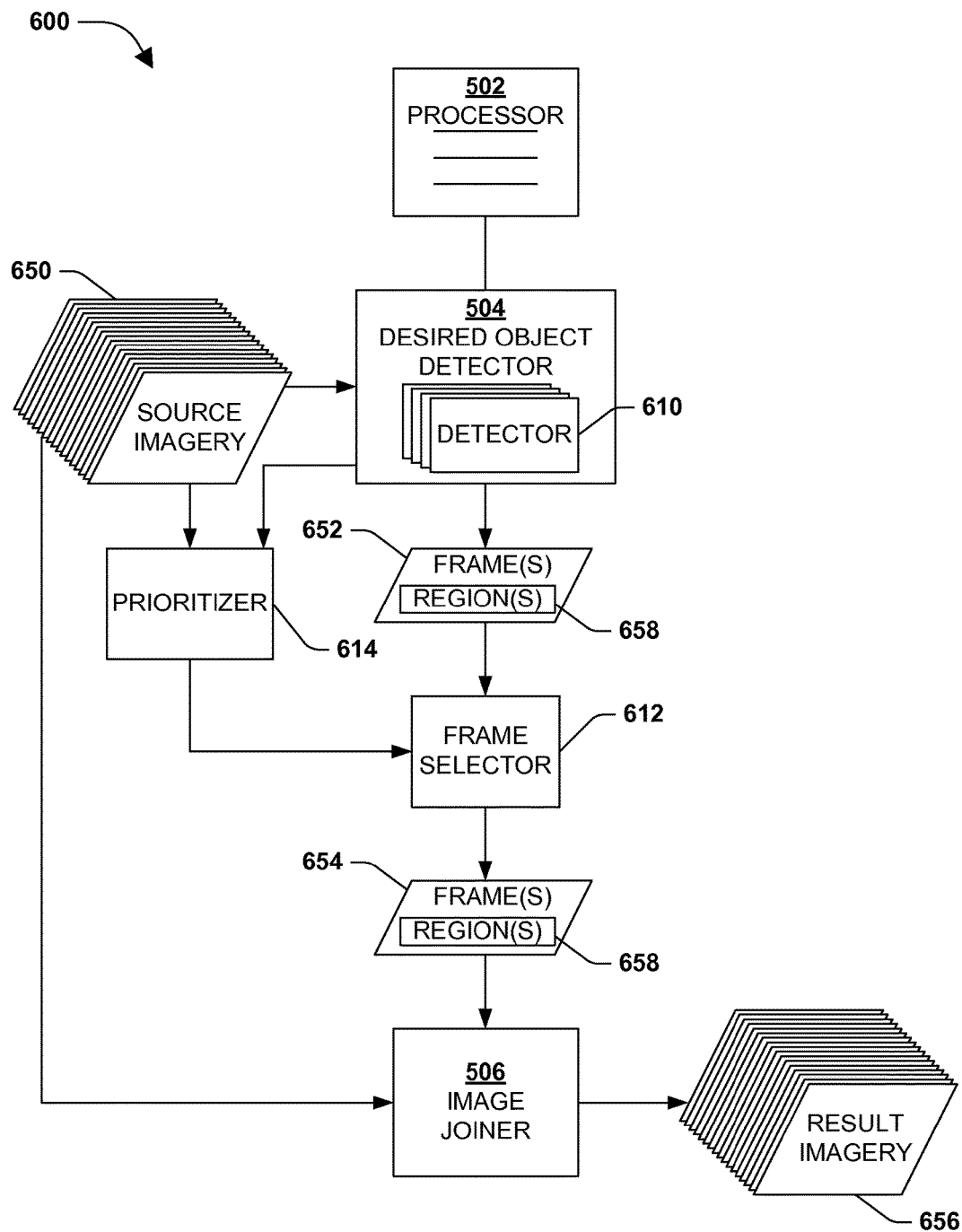
FIG. 6 is a component diagram illustrating an example embodiment where one or more systems described herein may be implemented.

FIG. 6 is a component diagram illustrating an example embodiment 600 where one or more systems described herein may be implemented. In this example 600, an extension of FIG. 5 is provided and thus description of elements, components, etc. described with respect to FIG. 5 may not be repeated for simplicity. In the example embodiment 600, a frame selection component 612 can be configured to select at least a first frame 654 from the one or more frames 652 for the image joining component 506. The first frame 654 can comprise an object region 658 comprising a desired object.

In one embodiment, the desired object detection component 504 can be configured to identify one or more object regions 658 in the one or more frames 652 of the planar panorama source imagery 650. In this embodiment, the one or more object regions 658 may respectively comprise at least one desired object. As one example, the desired object detection component 504 may identify a plurality of frames 652 that comprise the desired object, and identify an object region 658 in the respective plurality of frames 652. In this example, the frame selection component 612 may identify a frame 654, from the plurality of frames 652, which comprises a desired view of the desired object. In this example, this selected frame 654, comprising the object region 658 with the desired view of the desired object, may be provided to the image joining component 506.

In the example embodiment 600, the desired object detection component 504 can comprise a plurality of object detectors 610, where the respective object detectors 610 can be configured to detect merely one type of object in the planar panorama source imagery 650. As an example, the plurality of detectors 610 may comprise a building detector, a person detector, landscape detector (e.g., trees, bushes, etc.), vehicle detector (e.g., stopped and/or moving), sign detector (e.g., text detector for business and/or street signs), utility object detector (e.g., utility pole, stop light, power lines, etc.), road section detector (e.g., medians), business logo detector, and/or building entryway detector (e.g., business entries, doors, etc.), etc. In one embodiment, respective detectors may be activated and/or deactivated to provide a desired detection result.

In one embodiment, the plurality of object detectors 610 may comprise one or more positive object detectors that can be configured to detect a desired object, where the desired object may be intended to be included in the resulting planar panorama imagery 656. For example, a desired object can comprise things that a user of the resulting planar panorama imagery 656 may find useful, such as building signs, buildings, street signs, landmarks, street features, etc. In this example, detectors 610 that detect these desired objects may comprise positive object detectors.

In one embodiment, the plurality of object detectors 610 may comprise one or more negative object detectors that can be configured to detect a non-desired object, where the non-desired object may comprise an object that is not intended to be included in the resulting planar panorama imagery 656. For example, a non-desired object may comprise an item in an image that can reduce the user experience, such as objects that obscure a view of a desired object (e.g., trees, utility poles, etc.), objects that distract from a view of a location (e.g., moving cars, people, etc.), and/or distorted objects, etc. In this example, a detector 610 that detects a non-desired object may comprise negative object detector.

In the example embodiment 600, an object prioritization component 614 can be configured to prioritize selection of a first desired object over selection of a second desired object for inclusion in the resulting planar panorama imagery 656. The prioritization can be based at least upon a first desired prioritization associated with the first desired object and a second desired prioritization associated with the second desired object. As an example, certain objects may have a higher priority for a user of the resulting planar panorama imagery 656, such as business signs/logos, which may identify a particular business, over other objects, such as landscapes features. In one embodiment, object prioritization may be assigned based on user input, or may be assigned using a default setting (e.g., programmatically). In this way, for example, the object prioritization component 614 can provide for selection of a frame that may comprise a desired view of a higher priority object over selection of a frame that comprises a view of a lower priority object.

In one embodiment, the image joining component 506 can be configured to generate the resulting planar panorama imagery 656, where the resulting planar panorama imagery comprises a first desired object if the first desired object is prioritized over a second object and a first object region, comprising the first desired object, overlaps a second object region, comprising the second desired object, in the planar panorama source imagery 650. That is, for example, if the first and second desired objects overlap in one or more frames 652 of the planar panorama source imagery 650, the object prioritization component 614 can provide for selecting a frame that merely comprises the first object, and/or a frame that allows for cutting out the second object without affecting a view of the first object. Further, the object prioritization component 614 can provide for selecting a frame that comprises a view of both the first and second object, where they do not overlap, if available (e.g., 408 of FIG. 4B).

In one embodiment, the frame selection component 612 may be configured to select one or more of the one or more frames 652 for the image joining component 506, by selecting at least a first frame 654 that comprises at least a desired view of the desired object (e.g., unobscured, undistorted, an entirety of the object, etc.). In one embodiment, the frame selection component 612 can select at least a second frame 654, from the one or more frames, where the second frame does not comprise a non-desired object, for example, effectively removing the non-desired object from the resulting planar panorama imagery 656.

In one embodiment, the frame selection component 612 can select at least a third frame 654, from the one or more frames 652, where the third frame can comprise a desired view of the non-desired object (e.g., a view that does not obscure a desired object). Further, in this embodiment, the desired view of the non-desired object may allow for the non-desired object to be cut from the third frame, resulting in desired planar panorama imagery 656, for example, without the non-desired object.

Figure 7:
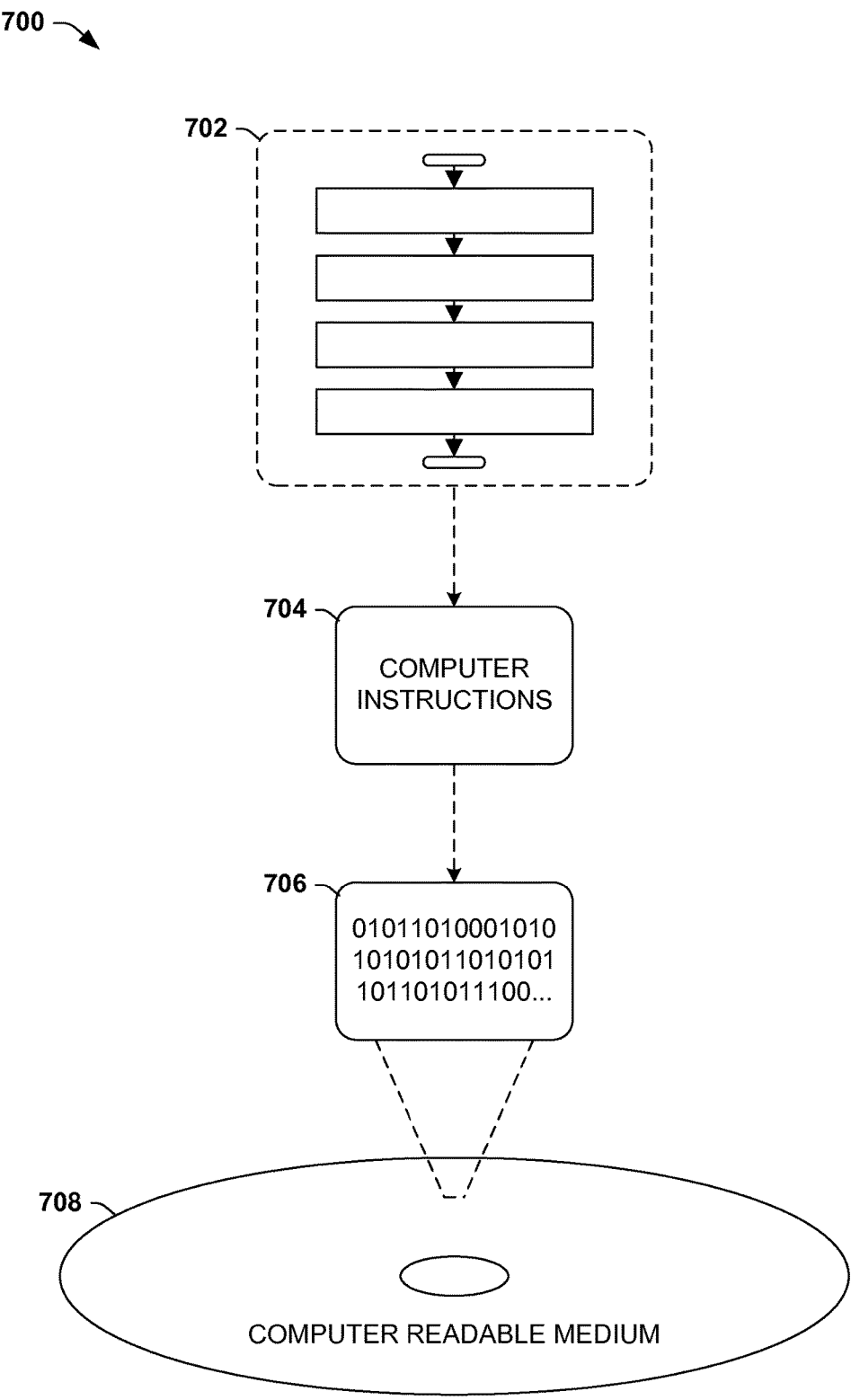
FIG. 7 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 7, wherein the implementation 700 comprises a computer-readable medium 708 (e.g., a CD-R, DVD-R, or a platter of a hard disk drive), on which is encoded computer-readable data 706. This computer-readable data 706 in turn comprises a set of computer instructions 704 configured to operate according to one or more of the principles set forth herein. In one such embodiment 702, the processor-executable instructions 704 may be configured to perform a method, such as at least some of the exemplary method 100 of FIG. 1, for example. In another such embodiment, the processor-executable instructions 704 may be configured to implement a system, such as at least some of the exemplary system 500 of FIG. 5, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 8:
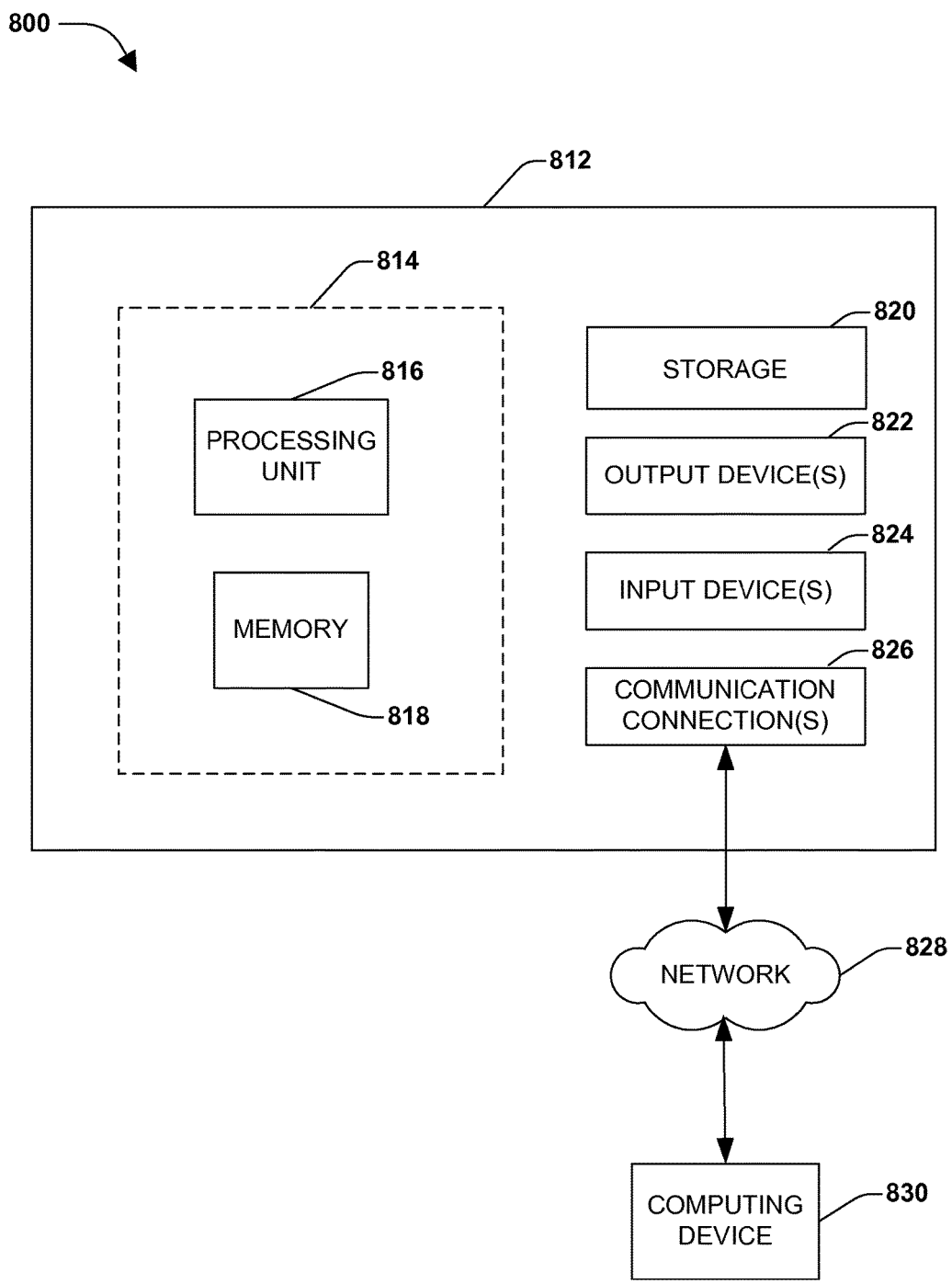
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 800 comprising a computing device 812 configured to implement one or more embodiments provided herein. In one configuration, computing device 812 includes at least one processing unit 816 and memory 818. Depending on the exact configuration and type of computing device, memory 818 may be volatile (such as RAM, for example), non-volatile (such as ROM, flash memory, etc., for example) or some combination of the two. This configuration is illustrated in FIG. 8 by dashed line 814.

In other embodiments, device 812 may include additional features and/or functionality. For example, device 812 may also include additional storage (e.g., removable and/or non-removable) including, but not limited to, magnetic storage, optical storage, and the like. Such additional storage is illustrated in FIG. 8 by storage 820. In one embodiment, computer readable instructions to implement one or more embodiments provided herein may be in storage 820. Storage 820 may also store other computer readable instructions to implement an operating system, an application program, and the like. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 812. Any such computer storage media may be part of device 812.

Device 812 may also include communication connection(s) 826 that allows device 812 to communicate with other devices. Communication connection(s) 826 may include, but is not limited to, a modem, a Network Interface Card (NIC), an integrated network interface, a radio frequency transmitter/receiver, an infrared port, a USB connection, or other interfaces for connecting computing device 812 to other computing devices. Communication connection(s) 826 may include a wired connection or a wireless connection. Communication connection(s) 826 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 812 may include input device(s) 824 such as keyboard, mouse, pen, voice input device, touch input device, infrared cameras, video input devices, and/or any other input device. Output device(s) 822 such as one or more displays, speakers, printers, and/or any other output device may also be included in device 812. Input device(s) 824 and output device(s) 822 may be connected to device 812 via a wired connection, wireless connection, or any combination thereof. In one embodiment, an input device or an output device from another computing device may be used as input device(s) 824 or output device(s) 822 for computing device 812.

Components of computing device 812 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 812 may be interconnected by a network. For example, memory 818 may be comprised of multiple physical memory units located in different physical locations interconnected by a network.

Those skilled in the art will realize that storage devices utilized to store computer readable instructions may be distributed across a network. For example, a computing device 830 accessible via network 828 may store computer readable instructions to implement one or more embodiments provided herein. Computing device 812 may access computing device 830 and download a part or all of the computer readable instructions for execution. Alternatively, computing device 812 may download pieces of the computer readable instructions, as needed, or some instructions may be executed at computing device 812 and some at computing device 830.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for generating planar panorama imagery, comprising:

analyzing a first frame of planar panorama source imagery to identify objects within the first frame, the analysis comprising:

comparing characteristics of the objects identified within the first frame to characteristics of a first type of object to classify a first object within the first frame corresponding to the first type of object; and comparing characteristics of the objects identified within the first frame to characteristics of a second type of object to identify a second object within the first frame corresponding to the second type of object;

analyzing a second frame of the planar panorama source imagery to identify objects within the second frame, the analysis comprising:

comparing characteristics of the objects identified within the second frame to characteristics of the first type of object to identify the first object within the second frame corresponding to the first type of object;

receiving an indication that the first object type has a higher prioritization than the second object type;

determining that the second object overlaps the first object in the first frame and that the second object does not overlap the first object in the second frame;

selecting the second frame, but not the first frame, for use in the planar panorama imagery based on the prioritization and the determination that the second object overlaps the first object in the first frame; and generating the planar panorama imagery with at least the second frame, but not the first frame.

2. The method of claim 1, the analyzing the second frame comprising:

comparing characteristics of objects identified within the second frame to characteristics of the second type of object to identify the second object within the second frame corresponding to the second type of object.

3. The method of claim 1, the analyzing the second frame comprising:

comparing characteristics of objects identified within the second frame to characteristics of the second type of object; and determining that the second object is not present in the second frame.

4. The method of claim 1, the first object located within a first object region of the first frame and the second object located with a second object region of the first frame and the determining that the second object overlaps the first object in the first frame comprising:

determining that a pixel of the first frame is situated within the first object region and the second object region.

5. The method of claim 1, comprising:

assigning a first prioritization to the first object; and
assigning a second prioritization to the second object.

6. The method of claim 5, comprising at least one of:

assigning the first prioritization to the first object based upon the first object being of the first type of object; or assigning the second prioritization to the second object based upon the second object being of the second type of object.

7. The method of claim 5, comprising at least one of:

assigning the first prioritization to the first object based upon user input; or assigning the second prioritization to the second object based upon user input.

8. The method of claim 1, characteristics of objects corresponding to at least one of an object shape, an object color, or an object edge.

9. The method of claim 1, the second frame consecutive to the first frame in the planar panorama source imagery.

10. A system for generating planar panorama imagery, comprising:

one or more processing units; and memory comprising instructions that when executed by at least one of the one or more processing units perform operations, comprising:

analyzing a first frame of planar panorama source imagery to identify objects within the first frame, the analysis comprising:

comparing characteristics of the objects identified within the first frame to characteristics of a first type of object to classify a first object within the first frame corresponding to the first type of object; and comparing characteristics of objects identified within the first frame to characteristics of a second type of object to classify a second object within the first frame corresponding to the second type of object;

analyzing a second frame of the planar panorama source imagery, the analysis comprising:

comparing characteristics of objects identified within the second frame to characteristics of the first type of object to classify the first object within the second frame corresponding to the first type of object;

receiving an indication that the first object type has a higher prioritization than the second object type;

determining that the second object overlaps the first object in the first frame and that the second object does not overlap the first object in the second frame;

selecting the second frame, but not the first frame, for use in the planar panorama imagery based on the prioritization and the determination that the second object overlaps the first object in the first frame; and generating the planar panorama imagery with at least the second frame, but not the first frame.

11. The system of claim 10, the analyzing the second frame comprising:

comparing characteristics of objects identified within the second frame to characteristics of the second type of object to identify the second object within the second frame corresponding to the second type of object.

12. The system of claim 10, the analyzing the second frame comprising:

comparing characteristics of objects identified within the second frame to characteristics of the second type of object; and determining that the second object is not present in the second frame.

13. The system of claim 10, the first object located within a first object region of the first frame and the second object located with a second object region of the first frame and the determining that the second object overlaps the first object in the first frame comprising:

determining that a pixel of the first frame is situated within the first object region and the second object region.

14. The system of claim 10, the operations comprising:

assigning a first prioritization to the first object; and
assigning a second prioritization to the second object.

15. The system of claim 14, the operations comprising at least one of:

assigning the first prioritization to the first object based upon the first object being of the first type of object; or assigning the second prioritization to the second object based upon the second object being of the second type of object.

16. The system of claim 14, the operations comprising at least one of:

assigning the first prioritization to the first object based upon user input; or assigning the second prioritization to the second object based upon user input.

17. The system of claim 10, characteristics of objects corresponding to at least one of an object shape, an object color, or an object edge.

18. The system of claim 10, the second frame consecutive to the first frame in the planar panorama source imagery.

19. A computer readable storage device comprising instructions that when executed perform a method for generating planar panorama imagery, the method comprising:
- accessing source imagery including at least a first frame and a second frame;
- receiving an indication that a first object type in source imagery has a higher prioritization than a second object type in the source imagery;
- comparing characteristics of objects within the first frame to characteristics of a first type of object to identify a first object within the first frame corresponding to the first type of object;
- comparing characteristics of objects within the first frame to characteristics of a second type of object to identify a second object within the first frame corresponding to the second type of object;
- comparing characteristics of objects identified within the second frame to characteristics of the first type of object to identify the first object within the second frame corresponding to the first type of object;
- determining that the second object overlaps the first object in the first frame and that the second object does not overlap the first object in the second frame;
- selecting the second frame, but not the first frame, for use in the planar panorama imagery based on the prioritization and the determination that the second object overlaps the first object in the first frame; and
- generating the planar panorama imagery with at least the second frame, but not the first frame.

20. The computer readable storage device of claim 19, wherein the first object is located within a first object region of the first frame and the second object located with a second object region of the first frame and the determining that the second object overlaps the first object in the first frame comprises determining that a pixel of the first frame is situated within the first object region and the second object region.

* * * * *